United States Patent [19]
Miyoshi et al.

[11] Patent Number: 5,619,795
[45] Date of Patent: Apr. 15, 1997

[54] METHOD FOR DESIGNING AN OIL RING

[75] Inventors: Katsuya Miyoshi; Ichiro Hirose, both of Hiroshima-ken, Japan

[73] Assignee: Mazda Motor Corporation, Hiroshima-ken, Japan

[21] Appl. No.: 353,247

[22] Filed: Dec. 2, 1994

[30] Foreign Application Priority Data

Dec. 2, 1993 [JP] Japan .................................... 5-302923
Dec. 2, 1993 [JP] Japan .................................... 5-302924

[51] Int. Cl.⁶ .................................................. B23P 15/00
[52] U.S. Cl. ................ 29/888.01; 29/888.3; 29/888.07
[58] Field of Search ........................... 29/888.07, 888.3, 29/888.01, 428; 277/139

[56] References Cited

U.S. PATENT DOCUMENTS 4,173,878 11/1979 Nemets et al. ....................... 29/888.07
5,016,524 5/1991 Kawai et al. ........................ 29/888.07
5,433,001 7/1995 Tsuchiya et al. .................... 29/888.07

*Primary Examiner*—Irene Cuda
*Attorney, Agent, or Firm*—Keck, Mahin & Cate

[57] ABSTRACT

An oil ring set has an expander between upper and bottom side rails for a piston of a reciprocal internal combustion engine. The oil ring set has dimensions determined so as to have a thickness satisfying a first relationship between a radial thickness and tension determined from a coefficient for an oil film thickness and a standard parameter representative of a predetermined thickness, a second relationship between a radial thickness and tension determined from a coefficient for an oil ring propensity to follow deformation and its pattern of the cylinder wall and a standard parameter representative of a predetermined amount of oil consumption, and a third relationship between a radial thickness and tension determined based on a coefficient representative of permanence of oil ring springiness against swelling and a standard parameter of the coefficient of springiness permanence.

21 Claims, 9 Drawing Sheets i=2 i=3 i=4

METHOD FOR DESIGNING AN OIL RING

BACKGROUND OF THE INVENTION

1. Field of the Invention

The present invention relates to an oil ring of a type having an expander between side rails and a method of designing the oil ring.

2. Description of Related Art

In order to prevent excessive oil consumption by scraping excess oil from a cylinder of a reciprocal internal combustion engines by oil rings, it has been known, as an oil consumption control technique, to control three primary factors. These factors are the thickness of an oil film on the cylinder wall, the springiness of an oil ring, which relates to the fact that the oil ring follows up deformation of the cylinder wall, and the adhesion of an oil ring in the ring groove. In order to maintain a desired oil film thickness, a surface pressure on the cylinder wall is set to approximately 8–9 kgf/cm². The control of the springiness of an oil ring is typically attempted by giving the oil ring a springiness coefficient greater than 0.4 so as to reduce a gap between the oil ring and the cylinder wall, caused due to deformation of the cylinder wall, so that it is as small as possible. In this instance, the term "springiness coefficient" used herein shall mean and refer to the degree of following up deformation of the cylinder wall. The degree of adhesion of an oil ring is controlled by increasing side rail stiffness so that it is as large as possible. This restrains swelling of the side rails caused by reciprocal motion of the piston which leads to oil leakage.

Typically, the particular parameters, i.e. the oil film thickness, the cylinder wall surface pressure and the side rail stiffness, are established so that these three primary factors of excessive oil consumption fall within a permissible extent obtained empirically. The parameters are further examined and verified in various combinations thereof so as to determine dimensions of the oil ring with the least excessive oil consumption. This design technique is, therefore, a trial-and-error method.

In the prior art design technique, an attempt to reduce tension of the oil ring has been made by focusing upon reducing frictional wear on or damage to the ring. Nevertheless, it has proved to be necessary to have the oil ring impart a high surface pressure on the cylinder wall as well as have low tension or be given a large springiness coefficient as well as have low tension. In any case, however, the side rails lose their stiffnesses, resulting in an increase in excessive oil consumption. Further, because of a high dependence upon experience and experiments, the design of oil rings varies widely.

SUMMARY OF THE INVENTION

It is an object of the present invention to provide a method of designing an oil ring which has the least tension and allows a considerably decreased amount of excessive oil consumption in which a relationship is established among engine speeds, the roundness of a cylinder bore, dimensions of the oil ring and the amount of oil consumption through the utilization of parameters representing gaps between the oil ring and the cylinder wall.

It is another object of the present invention to provide a method of designing an oil ring which enables the radial thickness of side rails to lead to a small-size oil ring.

It is still another object of the present invention to provide an oil ring which has the least tension and allows a considerably decreased amount of excessive oil consumption.

The above objects of the present invention are achieved by designing an oil ring set comprising an expander between upper or top and lower or bottom side rails fit in a ring groove cut into the piston of a reciprocal internal combustion engine in such a way that the oil ring set has dimensions so as to have a radial thickness satisfying the following specific relationships:

(a) a first relationship between an oil ring radial thickness and oil ring tension determined based on a coefficient for a thickness of an oil film on a cylinder wall and a standard parameter representative of a predetermined oil film thickness;

(b) a second relationship between an oil ring radial thickness and oil ring tension determined based on a coefficient representing a propensity of the oil ring set to follow up deformation and a pattern of the deformation of the cylinder wall and a standard parameter representative of a predetermined amount of oil consumption; and (c) a third relationship between an oil ring radial thickness and oil ring tension determined based on a coefficient representative of springiness permanence of the oil ring set against swelling and a standard parameter of the coefficient of springiness permanence of the oil ring set.

Specifically, the first to third relationships are formularized as follows:

$$b_r = [K^1 / \{D \cdot (Np \cdot D)^{1/2}\}] \cdot W^{1/2}$$

$$b_r = K^2 \cdot [D^3 / \{K^2 t_r^3 \cdot E_r \cdot Umax \cdot (i^2 - 1)^2\}] \cdot W$$

$$b_r = [\{b_3^2 \cdot n \cdot (b_3/3 + P_s/2)\} / (K^3 \cdot E_r \cdot t_r \cdot E_s \cdot b_s^3 \cdot t_s)]^{1/3} \cdot W^{1/3}$$

where W is an expansion tension of the oil ring set;

$K^1$ is the coefficient for a thickness of an oil film on a cylinder wall;

$K^2$ is the coefficient for a propensity of the oil ring set to follow up deformation and a pattern of the deformation of the cylinder wall;

$K^3$ is the coefficient representative of springiness permanence of the oil ring set;

$b_r$ is an axial thickness of each side rail;

$b_s$ is a material thickness of an expander;

$b_3$ is a height of the expander;

$t_r$ is the radial thickness of the side rail;

$t_s$ is a radial thickness of the expander;

$E_r$ is the Young's modulus of the side rail;

$E_s$ is the Young's modulus of the expander;

i is an order of deformation of the cylinder wall;

Umax is the i-th order deformation of the cylinder wall.

$P_s$ is a pitch between each adjacent slots of the expander;

D is a bore diameter of the oil ring set;

Np is a speed of the piston; and n is the number of the slots of the expander.

The radial thickness is determined so that the tension is in close proximity to the smallest value in a region defined so as to satisfy the following conditions all at once;

$$b_r \leq [(1.3 * 851.6) / \{D \cdot (Np \cdot D)^{1/2}\}] \cdot W^{1/2}$$

$$b_r \geq [\{b_3^2 \cdot n \cdot (b_3/3 + P_s/2)\} / (E_r \cdot t_r \cdot E_s \cdot bs^3 \cdot t_s)]^{1/3} / 0.9 / 6.90 * 10^{-5} \cdot W^{1/3}$$

$$b_r \leq (SLOC/10) \cdot [D^3 / \{t_r \cdot E_r \cdot Umax^1 (i^2 - 1)^2\}] \cdot W$$

where SLOC is a predetermined amount of oil consumption.

Further, the coefficient of an oil film thickness is defined as a thickness of an oil film on the cylinder wall when both the cylinder wall and the oil ring set are regarded as really round, and is set to be less than 1.3. Similarly, the coefficient of the propensity of the oil ring set is defined as a value representing a gap caused between the cylinder wall and the oil ring set due to the deformation of the cylinder wall, and is set to be less than the standard parameter representative of the predetermined amount of oil consumption. The coefficient representative of springiness permanence of the oil ring set is defined as a value representing a gap caused between the cylinder wall and the oil ring set due to swelling of the oil ring set, and is set to be less than 0.9.

The standard parameter of the predetermined thickness of the oil film and the standard parameter of the coefficient of springiness permanence of the oil ring set are, respectively, a ratio of a tentative thickness relative to a predetermined standard thickness which is set to be less than 1.30. A ratio of a tentative coefficient relative to a predetermined standard coefficient is set to be less than 0.90.

With this oil ring designing method, because parameters representing gaps, which cause oil consumption or oil leakage, are related to dimensions of the oil ring set, the oil ring set is designed so as to provide the smallest tension and the least excessive oil consumption. Furthermore, the design method makes it easy to evaluate dimensions, enabling a design of standardized oil ring sets. The oil ring sets designed by this method can be decreased in thickness and, accordingly, made small in overall size.

BRIEF DESCRIPTION OF THE DRAWINGS

The above and other objects and features of the present invention will be clearly understood from the following description of preferred embodiments when considered in conjunction with the accompanying drawings, in which.

DESCRIPTION OF THE PREFERRED EMBODIMENTS

Figure 1:
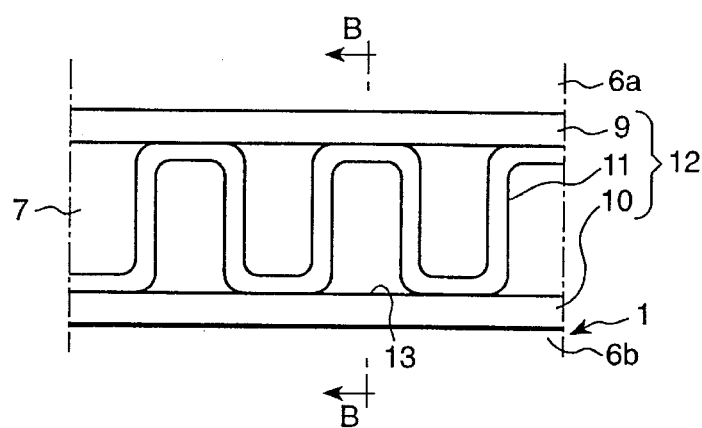
FIG. 1 is a view illustrating an oil ring set showing the structure in accordance with a preferred embodiment of the present invention.
Figure 2:
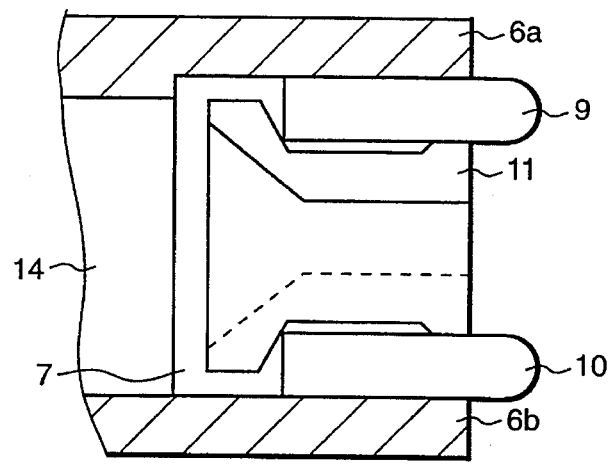
FIG. 2 is an enlarged view seen along line B—B of FIG. 1.

Referring now to the drawings in detail and, in particular, to FIGS. 1 and 2, an oil ring set 12 of a three piece type for use with a reciprocal internal combustion engine in accordance with a preferred embodiment of the present invention is shown. The oil ring set 12 has top and bottom steel side rails 9 and 10, and an expanding spring or expander 11 between the top and bottom side rails 9 and 10. This oil ring 12 is received in a ring groove 7 cut into a head of the piston 1 above a piston pin (not shown) and bordered by top and bottom groove banks 6a and 6b.

As is well known in the art, the oil ring is used to prevent excessive oil consumption by scraping excess lubrication oil from cylinder walls or cylinder liner walls and returning it to an oil pan sump. This provides a constant oil film thickness on the cylinder wall or the cylinder liner wall for every stroke of the piston. The amount of excessive oil consumption (LOC) increases with leakage of the lubrication oil into the combustion chamber due to the properties of the oil ring. Focusing on oil consumption in a reciprocal internal combustion engine having a piston which is provided with an oil ring of this type, the amount of leakage of the lubrication oil into a combustion chamber depends upon a gap or clearance between the oil ring 12 and the cylinder liner wall, which may unexpectedly be caused due mainly to three categories of mechanical factors. These factors are the thickness of an oil film $K^1$ on the cylinder liner wall (which is hereafter referred to as the oil film thickness), a gap $K^2$ between the oil ring 12 and the cylinder liner wall caused due to radial deformation of the cylinder liner wall (which is hereafter referred to as the radial deformation gap), and a gap $K^3$ caused due to undulation or swelling of the piston ring (which is hereafter referred to as the swelling gap). Each of these factors represents the size of a sectional-area of a path by which oil leaks into the combustion chamber.

Figure 8:
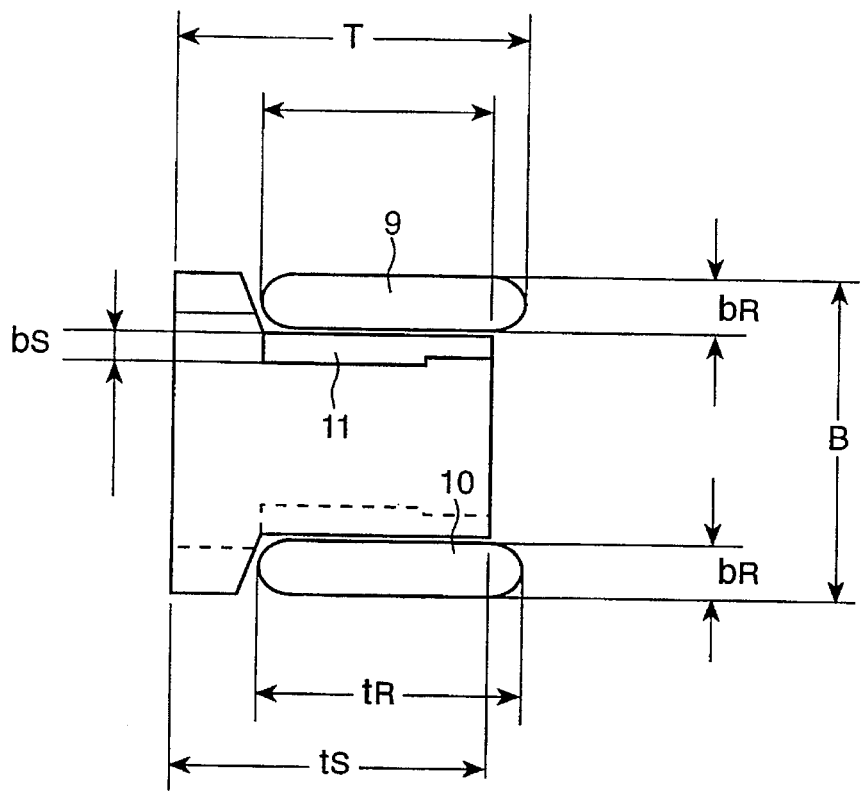
FIG. 8 is a diagram showing dimensions of the oil ring set.
Figure 9:
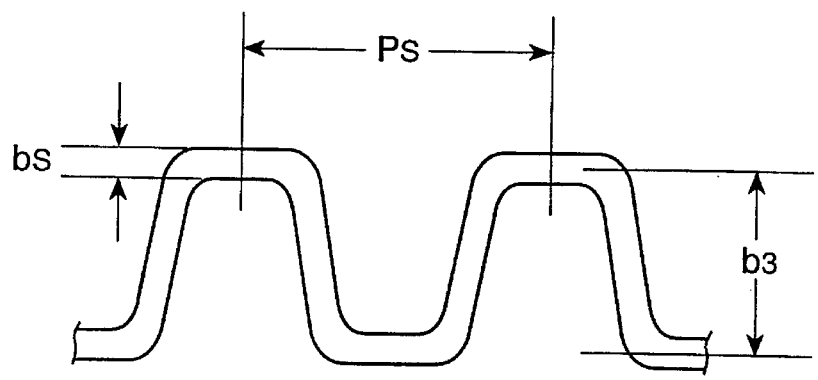
FIG. 9 is a diagram showing dimensions of a cross-section of the oil ring set.

Necessary design factors for oil rings and spring expanders, used to design the oil ring 12, are shown in FIGS. 8 and 9.

Figure 3:
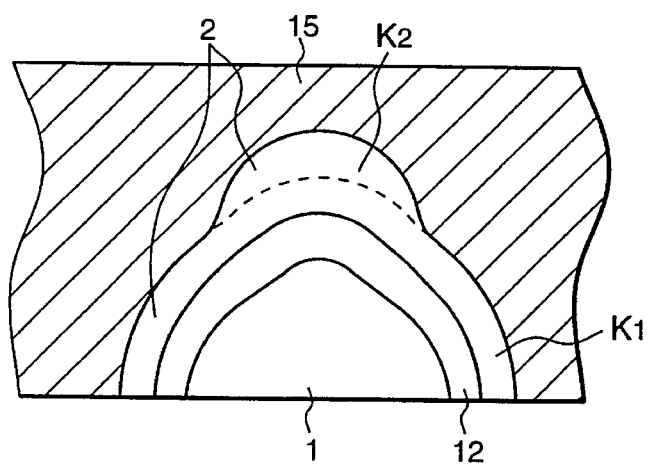
FIG. 3 is an illustration showing an interface between a piston and a cylinder liner.

The oil film thickness $K^1$, which is given as a thickness of an oil film on the cylinder liner wall if there is no deformation of the cylinder liner wall as illustrated with exaggeration in FIG. 3, can be obtained from a calculation of the following formula (I):

$$K^1 = br \cdot D \cdot (Np \cdot D/W)^{1/2} \ldots \quad (I)$$

where br is the axial thickness of either one of the top and bottom side rails;

D is the bore diameter of the oil ring set;

Np is the speed of a piston which is represented by the rotational speed of an engine; and W is the tension of the oil ring which is an expansion force of the oil ring produced by the expander.

On the other hand, the radial deformation gap $K^2$, which is given as a gap due to deformation of the cylinder liner which accompanies bolting the cylinder liner to the cylinder block, as illustrated with exaggeration in FIG. 3, can be obtained from a calculation of the following formula (II):

$$K^2 = \{b_r \cdot t_r^3 \cdot E_r \cdot U_{max} \cdot (i^2-1)^2\}/(W \cdot D^3) \quad \ldots \text{(II)}$$

where $t_r$ is the radial thickness of the side rail;
$E_r$ is the Young's modulus of the side rail;
$i$ is the order of deformation of the cylinder liner; and
$U_{max}$ is the i-th order deformation of the cylinder liner.

Figure 4A:
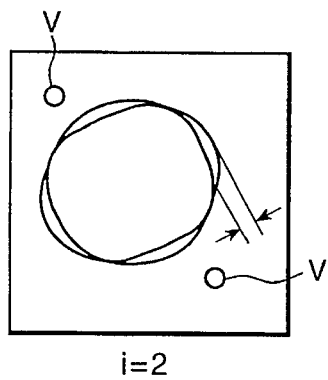
FIGS. 4A–4C are illustrations showing various deformation patterns of the cylinder liner.
Figure 4B:
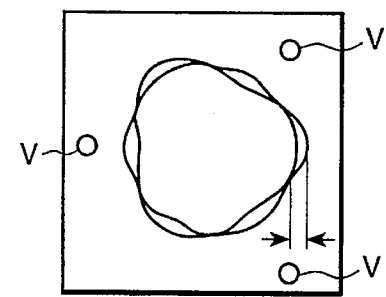
Figure 4C:
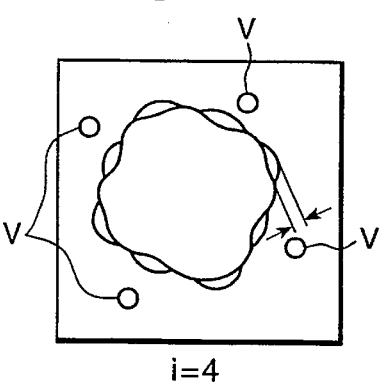

The deformation order $i$ is decided according to the number of bolts V for fixing the cylinder liner to the cylinder as shown in FIGS. 4A–4C. For instance, if four fixing bolts V with regular angular separations are used, the deformation order $i$ is four (4). The deformation order $i$ and the i-th order deformation $U_{max}$ are adopted so that they are the harshest ones for a predetermined standard radial deformation gap. More specifically, the sectional-area of a radial deformation gap $K^2$ can be calculated as a value resulting from subtracting a change in sectional-area due to a radial deformation of the oil ring, accompanying or following up a radial deformation of the cylinder liner wall, from the radial deformation of the cylinder liner wall. While the calculation is simple, nevertheless, even an estimate of absolute values thereof is very difficult. Consequently, in the calculation of a radial deformation gap $K^2$, there is adopted, as a substitution, an approximated value which is obtained by dividing a cylinder liner radial deformation multiplied by a parameter relating to a deformation order by an accompanying radial deformation of the oil ring. In this instance, the calculation of an accompanying radial deformation of the oil ring is made based on the idea that the side rail is a crossbeam as a structural element. For a detailed description of a representative example of such an approximation technique, reference may be had to SAE Technical Paper Series 841222, titled "Piston Ring Design For Reduced Friction" by Stephen H. Hill and Brian A. Newman.

Figure 5:
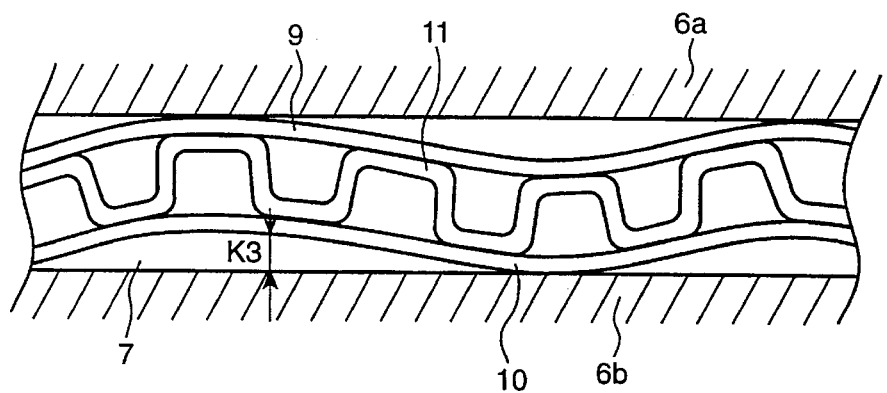
FIG. 5 is an illustration showing swelling of an oil ring set in a ring groove.
Figure 6:
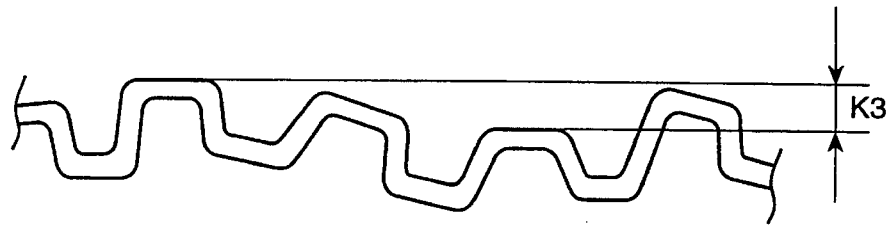
FIG. 6 is an illustration showing swelling of an expander.
Figure 7:
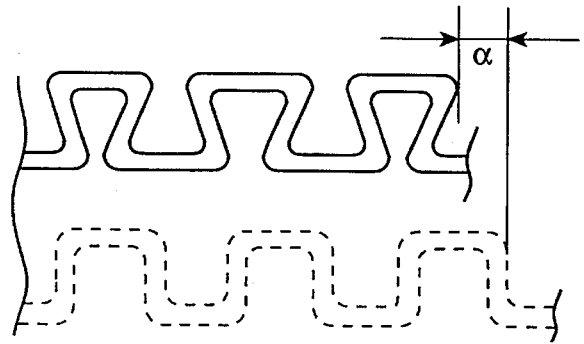
FIG. 7 is an illustration showing deflection or flexure of the expander.

FIGS. 5–7 are explanatory illustrations of swelling of the side rails. As shown in FIG. 5, the oil ring 12, with the spring expander 11 between the side rails 9 and 10, causes swelling in the ring groove 7 due to the springiness of the side rails 9 and 10 during strokes of the piston 1. Because it is difficult to perform an analysis and calculation of the amount of actual swelling of the oil ring 12, the swelling of the oil ring 12 is closely approximated by a parameter representing the propensity of the side rails following up the deformation of the oil ring 12 to deflection or flexure of the expander 11. That is, the amount of swelling of the expander 11 is calculated by dividing the amount of deflection of the spacer 12 by the stiffness of the side rail in a radial direction. Based on this approximation, the amount of swelling gas $K^3$ of the piston ring 12 is formularized as follows:

$$K^3 = \alpha/\beta \quad \ldots \text{(III)}$$

$$\alpha = \{W \cdot b_3^2 \cdot n \cdot (b_s/3 + P_s/2)\}/(E_s \cdot b_s \cdot t_s)$$

$$\beta = E_r \cdot b_r^3 \cdot t_r$$

$$b_3 = B - 2 \cdot b_{r-bs} - 0.1$$

$$n = \pi(D-T)/P_s$$

where $b_s$ is the material thickness of the expander;
$t_s$ is the radial thickness of the expander;
$b_3$ is the height of the expander;
$E_s$ is the Young's modulus of the expander;
$P_s$ is the pitch of the expander;
B is the axial thickness of the oil ring set; and
T is the radial thickness of the oil ring set.

As is apparent from the above, an increase in the amount of oil leakage or the amount of excessive oil consumption (LOC) is found based on the oil film thickness $K^1$, the radial deformation gap $K^2$ and the swelling gap $K^3$ given in the form of functions of the tension W of the oil ring set 12. In order to work out practical designs, these factors $K^1$, $K^2$ and $K^3$ are defined as coefficients representative of, respectively, the thickness of an oil film on the cylinder liner wall when both the cylinder liner and the oil ring 12 are regarded as really round, the propensity of the side rails 9 and 10 to follow up the radial deformation and its pattern of the cylinder liner wall, and the permanence of springiness of the side rails 9 and 10 in response to the swelling of the expander 11.

Figure 10:
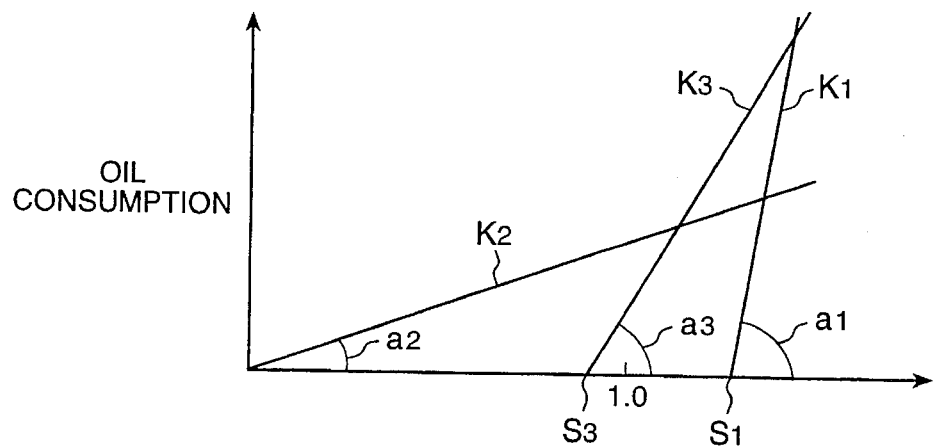
FIG. 10 is a diagram showing a relationship between the amount of oil consumption and various factors.

Referring to FIG. 10, shown therein is a diagram of the dependence of oil leakage or excessive oil consumption (LOC) on the respective factors $K^1$, $K^2$ and $K^3$. In the diagram, the vertical axis indicates the amount of excessive oil consumption (LOC) and the horizontal axis indicates standard ratios ($S^1$–$S^3$) of the respective factors of their standard values ($Z^1$–$Z^3$) with respect to their tentative experimental values ($K^1$–$K^3$). In this instance, these standard ratios ($S^1$, $S^2$, $S^3$) are calculated from the respective standard factor values ($Z^1$–$Z^3$) $K^1$ which are in conformity with a predetermined standard amount of excessive oil consumption (LOC).

The standard factor values ($Z^1$–$Z^3$) are calculated by substituting the following dimensions of the oil ring into the formulas (i) and (III):

$D = 78$ mm $U = 18.949$ m/sec $W = 3.1$ kgf $P_s = 4$ mm $E_r = 21,000$ kgf/mm$^2$ $E_s = 18,000$ kgf/mm$^2$ $b_r = 0.5$ mm $t_r = 2$ mm $b_s = 0.4$ mm $t_s = 2.2$ mm $b^3 = 1.5$ mm $n = 59.3$ The standard factor values $Z^1$ and $Z^3$ obtained on the basis of the calculations are as follows:

$Z^1 = 851.6$ $Z^3 = 6.90*10^{-5}$

The tentative experimental factor values $K^1$ and $K^3$ are set so as to satisfy the following conditions:

$K^1 \leq 1,100$ $K^3 \leq 7.00*10^{-5}$

These conditions which the tentative experimental factor values $K^1$ and $K^3$ should satisfy come from facts which are apparent from FIG. 10 The standard ratio $S^1$, $S^3$ is a boundary for a sudden increase in the amount of excessive oil consumption (LOC) due to each of the factors $K^1$ and $K^3$, and the standard ratio $S^3$ is a critical point for compression buckling of the side rails. Accordingly, the tentative experimental factor values $K^1$ and $K^3$ must be set less than the standard ratios $S^1$ and $S^3$, respectively shown in FIG. 10. For this reason, the standard ratios $S^1$ and $S^3$ relating to the oil ring for use with ordinary types of reciprocal internal combustion engines must satisfy the following conditions:

$$S^1 = k^1/Z^1 \leq 1.30$$

$$S^3 = k^3/Z^3 \leq 0.90$$

In other words, if the oil ring 12 has the standard ratios $S^1$ and $S^3$ satisfying the above conditions, it works so that there is an effective reduction in the amount of excessive oil consumption (LOC).

Figure 11:
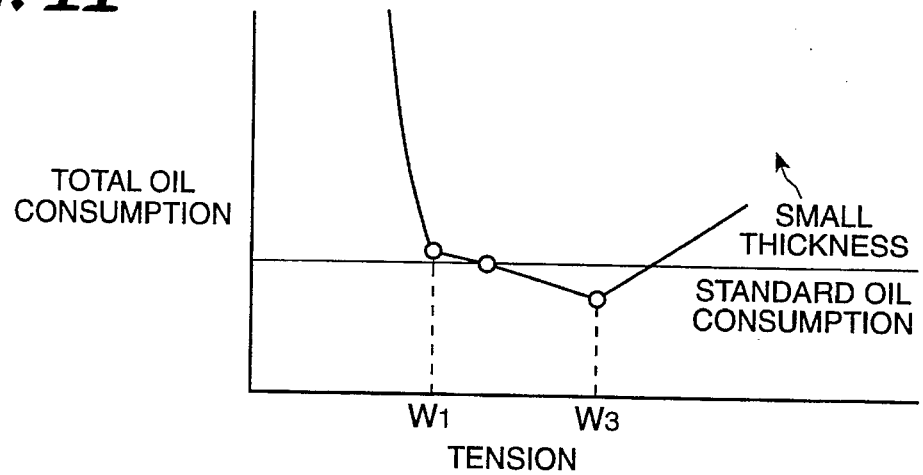
FIG. 11 is a diagram showing a relationship between the total amount of oil consumption and tension.

FIG. 11 illustrates the dependence of a total amount of oil leakage or excessive oil consumption (LOC) due to all of the factors $K^1$, $K^2$ and $K^3$ upon the tension W of an oil ring. The total amount of excessive oil consumption (LOC) suddenly increases before and after tensions $W^1$ and $W^3$ as boundaries. This is because the tensions $W^1$ and $W^3$ are parameters conforming with the standard ratios $S^1$ and $S^3$, respectively. Since the amount of excessive oil consumption (LOC) has high dependence upon the factors $K^1$ and $K^3$ in particular, the control of the total amount of excessive oil consumption (LOC) is likely infeasible in the range where the factors $K^1$ and $K^3$ can not be disregarded on the amount of excessive oil consumption (LOC), i.e, where the standard ratios $S^1$ and $S^3$ are not less than 1.30 and 0.90, respectively. Accordingly, in order for the oil ring to provide well controlled excessive oil consumption (LOC), it is essential to determine dimensions of the oil ring with the utilization of standard ratios $S^1$ and $S^3$ which are less than 1.30 and 0.90, respectively.

The total amount of excessive oil consumption (TLOC) is calculated from the following formula:

$$TLOC=(S^1-1.3)*a^1+S^2*a^2+(S^3-0.9)*a^3 \ldots \quad (IV)$$

where $(S^1-1.3)$ is put equal to zero (0) when the standard ratio
$S^1$ is less than 1.3;
$(S^3-0.9)$ is put equal to zero (0) when the standard ratio $S^3$ is less than 0.9;
$a^1=300$;
$a^2=10$; and
$a^3=70$ As long as the standard ratios $S^1$ and $S^3$ are less than 1.30 and 0.90, respectively, only the factor $K^2$ governs the total amount of excessive oil consumption (TLOC). It is satisfactory to consider the factor $K^2$ only in controlling the total amount of excessive oil consumption (TLOC).

Figure 12:
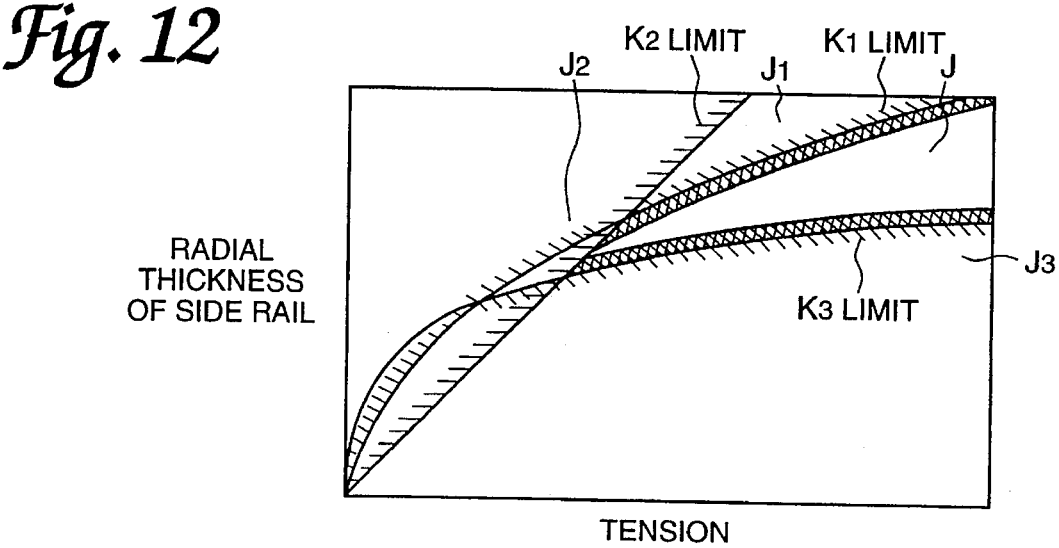
FIG. 12 is a diagram showing a relationship between the radial thickness of a side rail and tension.

FIG. 12 shows the relationship between the radial thickness of a side rail and the tension of an oil ring. In designing the oil ring set 12, specific dimensions are determined so that the radial thickness of the side rails 9, 10 and the tension of the oil ring set 12 fall in an acceptance region J. Regions $J^1$, $J^2$ and $J^3$ are defined by the radial thickness $b_r$ of the side rail satisfying the following conditions (V), (VI) and (VII), respectively:

$$br \leq [(1.3*851.6)/\{D \cdot (U \cdot D)^{1/2}\}] \cdot W^{1/2} \ldots \quad (V)$$

$$br \geq [\{b_3^2 \cdot n \cdot (b_3/3+P_s/2)/(Er \cdot tr \cdot Es \cdot bs^3 \cdot ts)\}^{1/3}/0.9/6.90*10^{-5} \cdot W^{1/3} \ldots \quad (VI)$$

$$br \leq (standard\ LOC/10) \cdot [D^3/\{tr \cdot Er \cdot Umax \cdot (i^2-1)^2\}] \cdot W \ldots \quad (VII)$$

The acceptance region J is defined as an area where the above three conditions (V), (VI) and (VII) are satisfied all at once. As was previously described, the factor $K^2$ is established so as to take any value in the region $J^2$ where an increase in the amount of excessive oil consumption (LOC) depends only upon the factor $K^2$ so as to satisfy the predetermined standard amount of excessive oil consumption (LOC). Under the limitation of the factor $K^2$ thus established, the radial thickness br of the side rail is determined so as to be in conformity with the smallest tension for the purpose of the smallest wear of the oil ring.

Specifically, before determining the radial thickness of the side rail, tentative experimental dimensions of the oil ring are provided. Thereafter, making use of calculation machines, such as computers, a feasibility estimate is made to sort certain designs, which have radial thicknesses of the side rail included within the acceptance region J, from others. Then, a selection is made from among these feasible designs to figure out the practical radial thickness of the side rail in conformity with the smallest tension.

Figure 13:
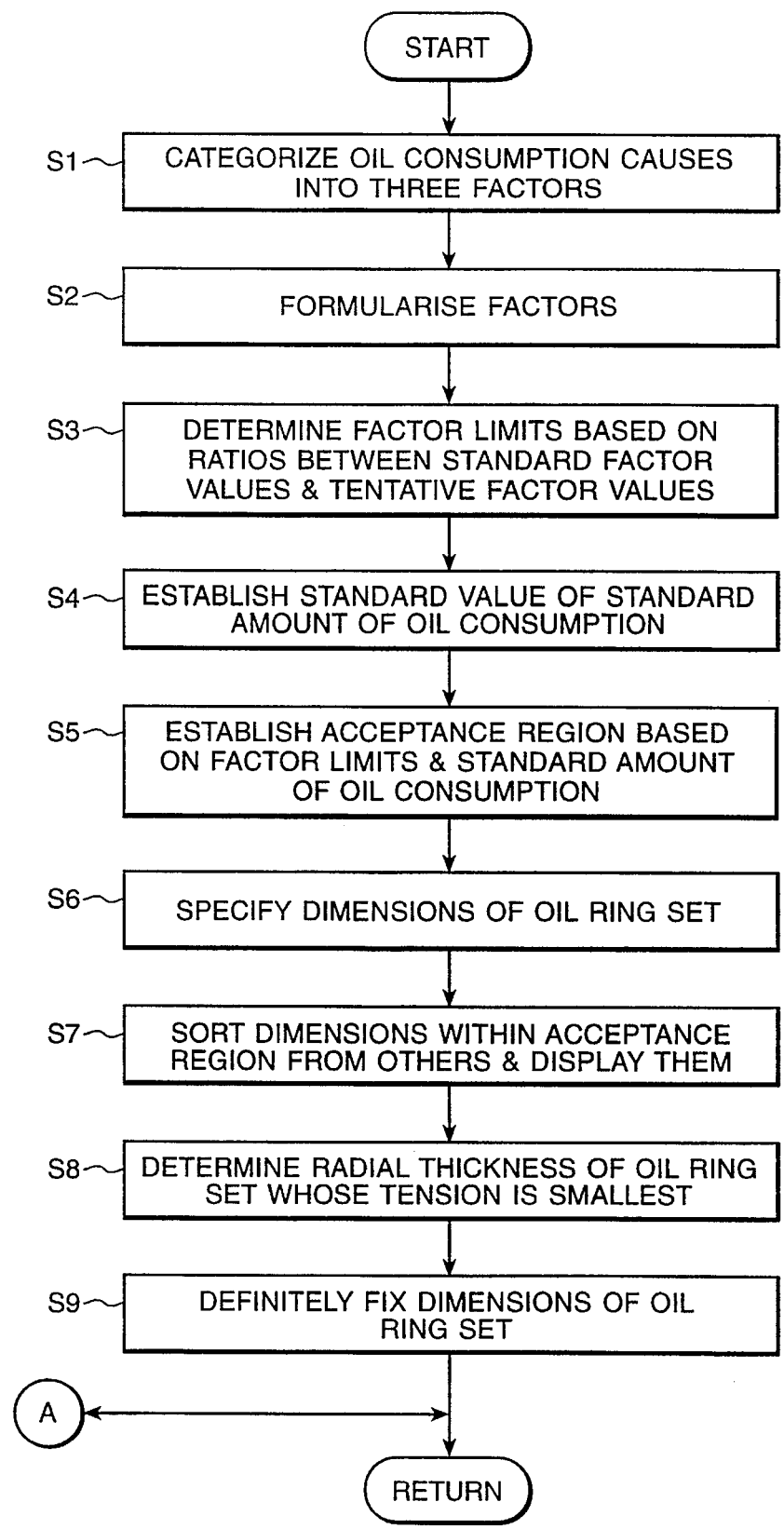
FIG. 13 is a flow chart illustrating an oil ring design sequence.

The design sequence of the oil ring will be best understood by reviewing FIG. 13.

FIG. 13 is a flow chart illustrating an oil ring design sequence according to the present invention. The first step at step S1 is to make an analytical evaluation for categorizing various causes of excessive oil consumption, such as gaps potentially occurring between oil rings and the cylinder liner walls, into the three factors $K^1$, $K^2$ and $K^3$. Then, these factors $K^1$, $K^2$ and $K^3$ are respectively formularized at step S2. On the basis of the standard ratios $(S^1-S^3)$ of the standard factor values $(Z^1-Z^3)$ with respect to the tentative experimental factor values $(K^1-K^3)$, limits are specified for these factors $K^1$, $K^2$ and $K^3$ of excessive oil consumption, respectively, at step S3. Subsequently, the standard amount of excessive oil consumption (LOC) is established at step S4. With the utilization of the limits of the factors $K^1$, $K^2$ and $K^3$ and the standard amount of excessive oil consumption, an optimum acceptance region J is defined for acceptable side rail radial thicknesses dr at step S5. Thereafter, tentative designs are provided so as to determine specific dimensions of the oil ring set 12 excepting the radial thickness of the side rails 9 and 10 at step S6. Then, a feasibility estimate is conducted to sort and figure out feasible designs which contain radial thicknesses of the side rail within the optimum acceptance region J at step S7. At step S8, among these feasible designs, a practical radial thickness of the side rails 9 and 10 is determined so as to be in conformity with the smallest tension. Finally, on the basis of the radial thickness of the side rails 9 and 10 thus determined, the remaining dimensions of the oil ring of the selected design are secured so as to be practical at step S9. In this design sequence, through step S1–S9 described above, the specific dimensions of the oil ring are unconditionally determined.

Figure 14:
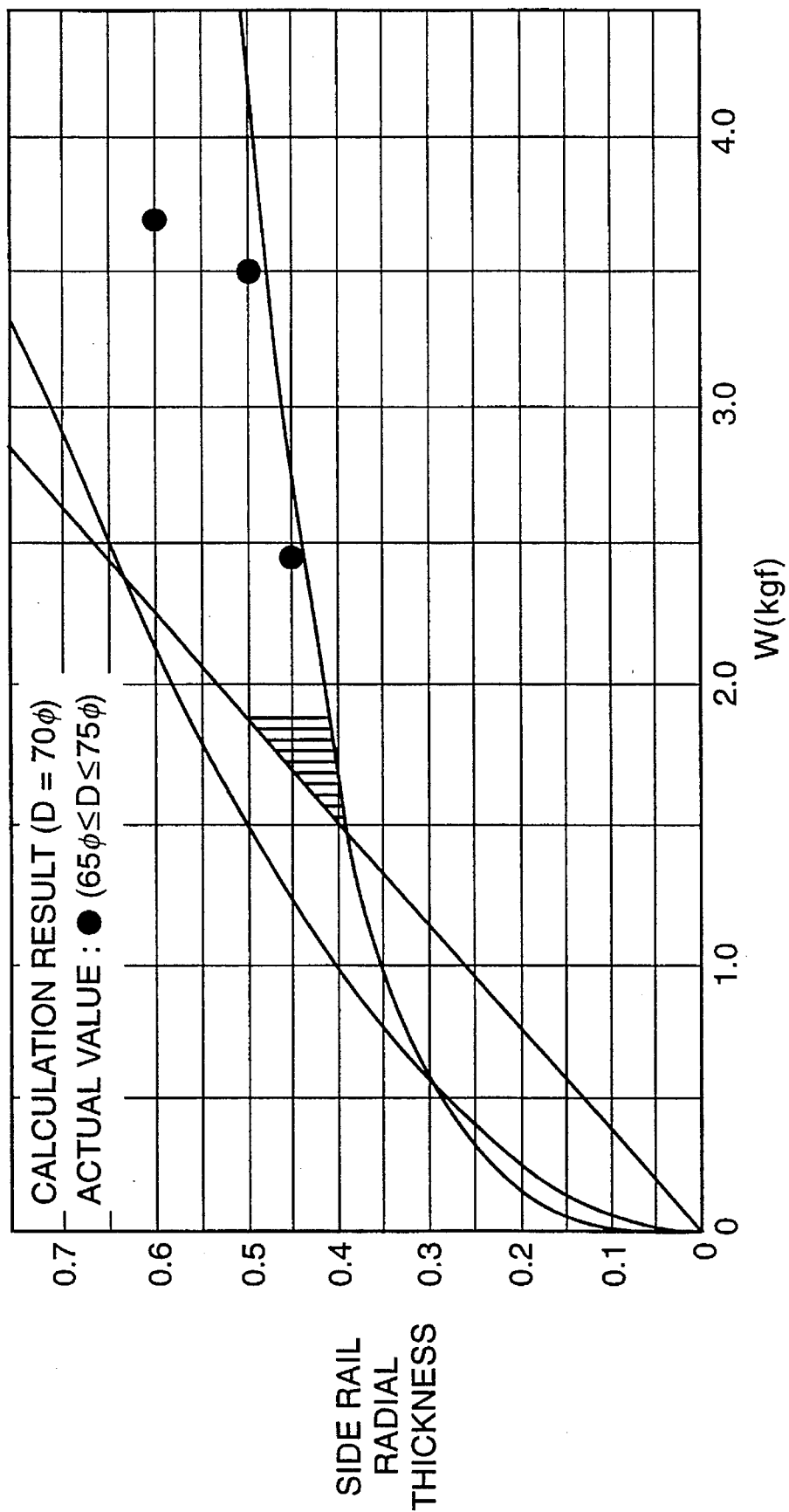
FIGS. 14–16 are diagrams showing optimum acceptable ranges of the oil ring sets having bore diameters of 70, 80 and 90 mm, respectively.
Figure 15:
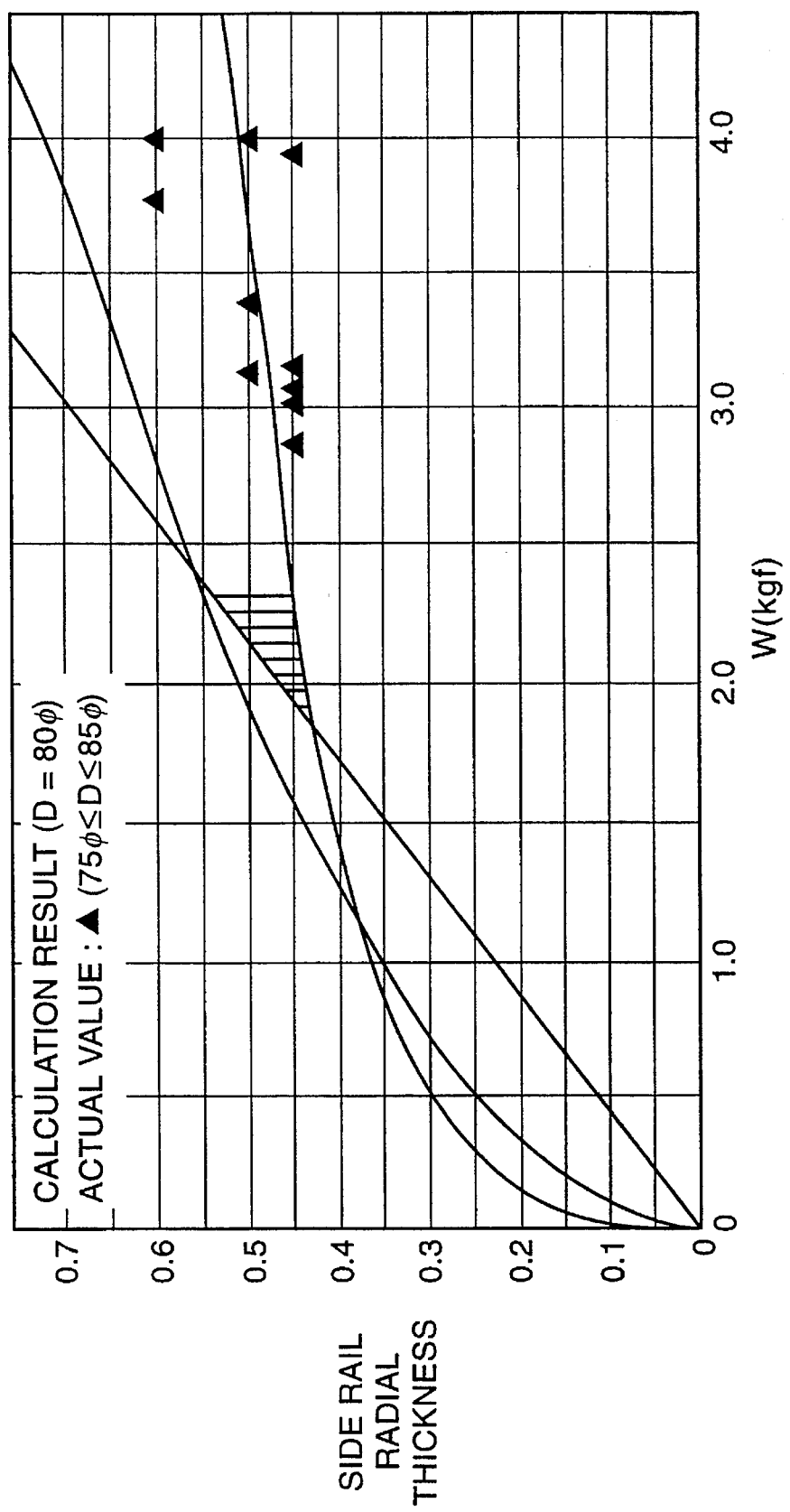
Figure 16:
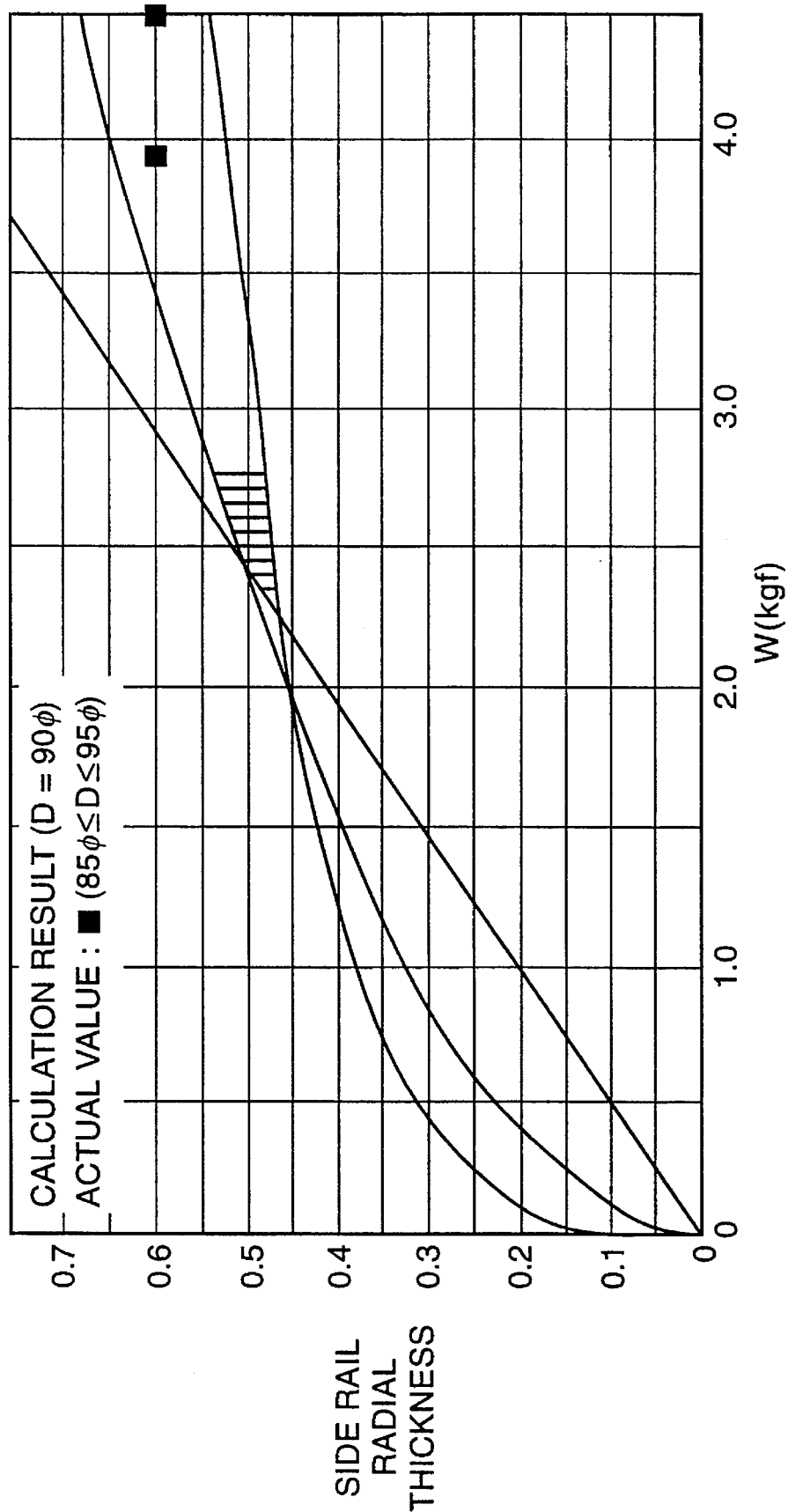

FIGS. 14–16 are diagrams, similar to that shown in FIG. 12 but practically drawn up for oil rings having bore sizes of 70, 80 and 90 mm, respectively, for defining optimum acceptance regions J for unconditionally determining the specific dimensions of these oil rings. The optimum acceptance region J is shaded in each diagram. In these diagrams, circle, triangular or square points in deep black indicate the thickness of side rings of actual prior art oil ring sets. In design sequence, various feasible combinations of specific dimensions of an oil ring, included within an optimum acceptance region J, are first figured out. Then the radial thickness of the side rail is determined so as to be in conformity with the smallest tension. The design sequence is, so to speak, an anticipation of a design target of the oil ring set, enabling the oil ring design to be performed unconditionally and more suitably as compared with the prior art design techniques. Furthermore, specifying limits for these factors $K^1$, $K^2$ and $K^3$, into which various causes of excessive oil consumption are categorized, enables the oil ring design to give the side rails the most suitable radial thickness and a low coefficient of friction, working with as small tension imparted thereto as possible. In addition, such an oil ring permits incorporation of a small radial side rails thickness, rendering it feasible to make the oil ring small in size.

Figure 17:
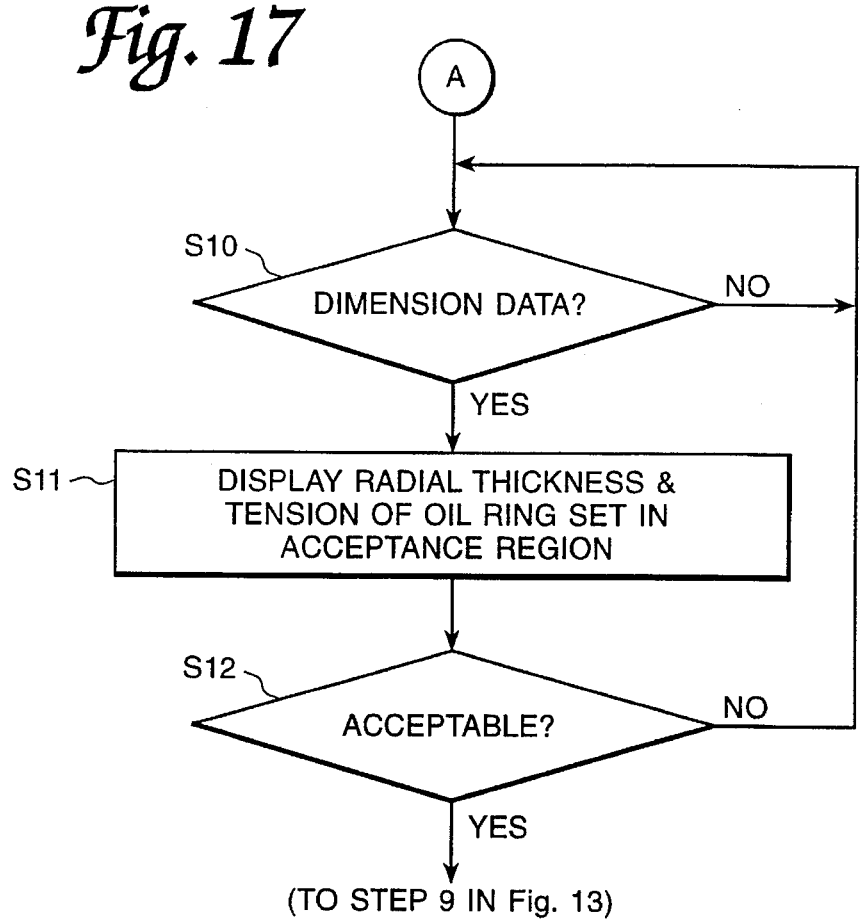
FIG. 17 is a flow chart illustrating another oil ring design sequence.

The design sequence illustrated in FIG. 13 may be modified with additional procedures as shown in FIG. 17.

FIG. 17 is a part of a flow chart illustrating an additional part of the oil ring design sequence shown in FIG. 13. After having fixed the dimensions of the oil ring set 12 at step S9 in FIG. 13, additional steps take place and the sequence proceeds to a functional block at step S10. At this step S10, a decision is made as to whether there is an entry of data representative of the dimensions of the oil ring which has been secured at step S9. If the dimensional data has been entered, or the answer to this decision is "YES," then at step S11, the fixed values of the radial thickness of the side rail and the tension of the oil ring are plotted within the optimum acceptance region J on the diagram drawn on, for instance, a monitor screen at step S5. Thereafter, an on-screen examination is made to decide the acceptability of these fixed values at step S12.

Figure 18:
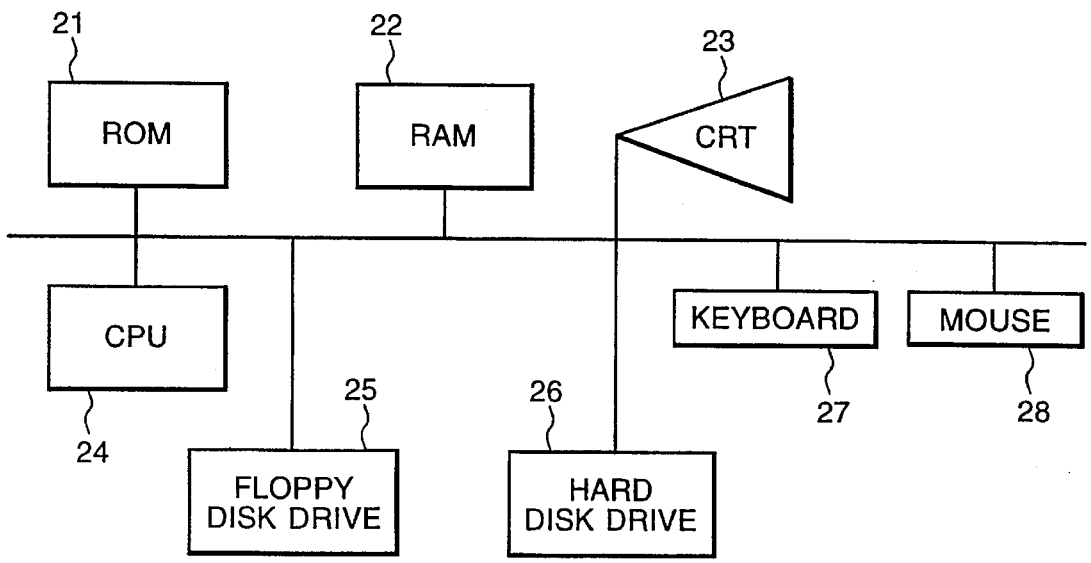
FIG. 18 is a block diagram illustrating a modification of the oil ring design method.

The oil ring design sequence may be performed with the utilization of a computer graphic technique as shown in FIG. 18. Data relating to specific dimensions of the oil ring set is entered into a center processing unit (CPU) 24 through a data entry means, such as a keyboard 27 or a mouse 28. The CPU 24 computes the dimensions to provide feasible thicknesses of the side rail and tension of the oil ring set and displays them on a CRT screen 23. ROM 21 and RAM 22, which contain examination programs, judge whether the thickness and tension on the CRT screen 23 are acceptable or not based on programmed data of acceptable oil ring dimensions and displays a result of the programmed examination. Data representative of examined oil ring dimensions are recorded on a floppy disk or a hard disk driven by a floppy disk drive 25 and a hard disk drive 26, respectively.

It is to be understood that although the present invention has been described with regard to preferred embodiments thereof, various other embodiments and variants may occur to those skilled in the art. Those other embodiments which are within the scope and spirit of the invention are intended to be covered by the following claims.

What is claimed is:

1. A method of making an oil ring set for a reciprocal internal combustion engine comprising the steps of:

forming an upper side rail and a bottom side rail;

forming an expander; and fitting said expander between said upper side rail and said bottom side rail so that said oil ring set will fit in a ring groove cut into a piston and satisifes a first relationship between a radial thickness of the oil ring set and tension of said oil ring set based on a coefficient for a thickness of an oil film on a cylinder wall and a standard parameter representative of a predetermined thickness of said oil film, a second relationship between said radial thickness and tension of said oil ring set based on a coefficient for a propensity of said oil ring set to follow deformation of said cylinder wall and a pattern of said deformation of said cylinder wall and a standard parameter representative of a predetermined amount of oil consumption, and a third relationship between said radial thickness and tension of said oil ring set based on a coefficient representative of springiness permanence of said oil ring set against swelling and a standard parameter of said coefficient representative of springiness permanence of said oil ring set.

2. A method as defined in claim 1, wherein said first relationship includes a fifth relationship between said tension and an amount of oil consumption.

3. A method as defined in claim 2, wherein said second relationship includes a sixth relationship between said tension and an amount of oil consumption.

4. A method as defined in claim 3, wherein said third relationship includes a seventh relationship between said tension and an amount of oil consumption.

5. A method as defined in claim 2, wherein said fifth relationship defines a first tension so as to make said amount of oil consumption less than a predetermined amount.

6. A method as defined in claim 4, wherein said seventh relationship defines a second tension so as to make said amount of oil consumption less than a predetermined amount.

7. A method as defined in claim 4, wherein said fifth relationship defines a first tension so as to make said amount of oil consumption less than a predetermined amount, said seventh relationship defines a second tension so as to make said amount of oil consumption less than a predetermined amount, and said sixth relationship defines a standard amount of oil consumption between said amounts of oil consumption in conformity with said first and second tensions, respectively.

8. An oil ring designing method as defined in claim 7, wherein at least one of said tensions is calculated based on said standard amount of oil consumption and said sixth relationship.

9. A method as defined in claim 8, wherein said radial thickness is determined so that at least one of said tensions is in close proximity to a smallest tension in a predetermined region.

10. A method of making an oil ring set for a reciprocal internal combustion engine comprising the steps of:

forming an upper side rail and a bottom side rail;

forming an expander;

categorizing causes of oil consumption in a combustion chamber of said reciprocal internal combustion engine into specific factors;

determining a limit value of each of said specific factors based on a standard value of one of said specific factors and a tentative value of said one of said specific factors;

establishing a standard amount of said oil consumption;

defining an acceptance region relating to a radial thickness of said upper side rail and said lower side rail and tension of said oil ring set based on limit values of said specific factors and said standard amount of said oil consumption;

tentatively determining a plurality of combinations of specific dimensions of said oil ring set;

sorting specific combinations of said plurality of combinations of said specific dimensions which contain said radial thickness and said tension falling within said acceptance region;

determining a definite radial thickness contained in a combination of said specific dimensions which contains a smallest tension among said specific combinations;

determining said specific dimensions based on said definite radial thickness; and fitting said expander between said upper side rail and said bottom side rail so that said oil ring set will fit in a ring groove cut into a piston and has said specific dimensions.

11. A method as defined in claim 10, wherein said specific factors include a coefficient for a thickness of an oil film on a cylinder wall, a coefficient for a propensity of said oil ring set to follow deformation of said cylinder wall and a pattern of said deformation of said cylinder wall, and a coefficient representative of springiness permanence of said oil ring set.

12. A method as defined in claim 1, wherein said first, second and third relationships are expressed by:

$$b_r = [K^1/\{D \cdot (Np \cdot D)^{1/2}\}] \cdot W^{1/2};$$

$$b_r = K^2[D^3/\{K^2 \cdot tr^3 \cdot Er \cdot Umax \cdot (i^2-1)^2\}] \cdot W; \text{ and}$$

$$b_r = [\{b_3^2 \cdot n \cdot (b_3/3 + Ps/2)\}/(K^3 \cdot Er \cdot tr \cdot Es \cdot bs^3 \cdot ts)]^{1/3} \cdot W^{1/3}; \text{ and}$$

wherein $b_r$ is an axial thickness of each of said side rails;

$b_s$ is a material thickness of the expander;

$b_3$ is a height of the expander;

W is the tension of said oil ring set;

$K^1$ is a coefficient for the thickness of the oil film on the cylinder wall;

$K^2$ is the coefficient for the propensity of the oil ring set to follow deformation of the cylinder wall and a pattern of the deformation of the cylinder wall;

$K^3$ is the coefficient representative of springiness permanence of the oil ring set;

D is a diameter of a bore of the oil ring set;

Np is a speed of a piston;

tr is a radial thickness of each of the side rails;

ts is a radial thickness of the expander;

Er is Young's modulus of the side rails;

Es is Young's modulus of the expander;

i is an order of deformation of the cylinder wall;

Umax is an i-th order deformation of the cylinder wall;

Ps is a pitch between adjacent slots of the expander; and n is a number of slots of the expander.

13. A method as defined in claim 12, wherein said radial thickness of the oil ring set is determined so that said tension is proximate to a smallest tension in a region in which:

$$b_r \leq [(1.3 * 851.6)/\{D \cdot (Np \cdot D)^{1/2}\}] \cdot W^{1/2};$$

$$b_r \geq [\{b_3^2 \cdot n \cdot (b_3/3 + Ps/2)/(Er \cdot tr \cdot Es \cdot bs^3 \cdot ts)\}]^{1/3}/0.9/6.90*10^{-5}] \cdot W^{1/3}; \text{ and}$$

$$b_r \leq (SLOC/10) \cdot [D^3/\{tr \cdot Er \cdot Umax \cdot (i^2-1)^2\}] \cdot W; \text{ and}$$

wherein SLOC is a predetermined amount of oil consumption.

14. A method as defined in claim 13, wherein said coefficient for the thickness of an oil film is defined as a thickness of an oil film on the cylinder wall when both said cylinder wall and said oil ring set are regarded to be ideally round.

15. A method as defined in claim 14, wherein said coefficient for the thickness of an oil film is set to be less than 1.3.

16. A method as defined in claim 15, wherein said standard parameter representative of a predetermined thickness of said oil film is a ratio of a tentative thickness relative to a predetermined standard thickness.

17. A method as defined in claim 16, wherein said standard parameter is set to be less than 1.30.

18. A method as defined in claim 13, wherein said coefficient representative of springiness permanence of the oil ring set is defined as a value representing a gap caused between said cylinder wall and said oil ring set due to swelling of said oil ring set.

19. A method as defined in claim 18, wherein said coefficient representative of springiness permanence of the oil ring set is set less than 0.9.

20. A method as defined in claim 19, wherein a standard parameter of said coefficient representative of springiness permanence of the oil ring set is a ratio of said coefficient relative to a predetermined standard coefficient.

21. A method as defined in claim 20, wherein said standard parameter of said coefficient representative of springiness permanence of the oil ring set is set to be less than 0.90.

* * * * *